United States Patent [19]

Southworth et al.

[11] Patent Number: 4,713,693

[45] Date of Patent: Dec. 15, 1987

[54] COMPOSITE SINGLE VIDEO IMAGE SYSTEM AND METHOD UTILIZING VIDEO PEAK STORING MEMORY

[75] Inventors: Glen R. Southworth; Robert J. Cornilsen, both of Boulder, Colo.

[73] Assignee: Colorado Video, Incorporated, Boulder, Colo.

[21] Appl. No.: 638,299

[22] Filed: Aug. 6, 1984

[51] Int. Cl.$^4$ .............................................. H04N 5/14
[52] U.S. Cl. ..................................... 358/160; 358/22; 358/105
[58] Field of Search .................. 358/160, 22, 105, 183, 358/182

[56] References Cited

U.S. PATENT DOCUMENTS

| 3,478,164 | 11/1969 | Southworth | 358/140 |
| 4,148,070 | 4/1979 | Taylor | 358/160 |
| 4,168,510 | 9/1979 | Kaiser | 358/105 |
| 4,233,631 | 11/1980 | Mahler | 358/22 |
| 4,249,212 | 3/1981 | Ito et al. | 358/22 |
| 4,296,434 | 10/1981 | Drewery et al. | 358/105 |

FOREIGN PATENT DOCUMENTS 0130829 10/1979 Japan ..................... 358/105

OTHER PUBLICATIONS

"Video Peak Store 493", data sheets, Colorado Video Inc., 12/86.
Southworth, Glen, "Digital Photography", Imaging Technology, May 1984.
Sugimoto, Atsumi, "NEC's FS-16 Frame Synchronizer Revolutionizes TV Production", JEE, 2/80, vol. 17, No. 158, pp. 52-54.
"A Magnetic Disc Video-Scan Converter", by G. R. Southworth, Society of Motion Picture and Television Engineers, Jun. 1968, vol. 77, No. 6.
"The Tricolor Cartograph A Display System with Automatic Coloring Capabilities" by W. J. Kubitz and W. J. Poppelbaum, Information Display, Nov./Dec. 1969.

*Primary Examiner*—James J. Groody
*Assistant Examiner*—David E. Harvey

[57] ABSTRACT

A system and method for forming composite single video images utilizing a video peak storing memory to enable new information to be added on a preselected basis to a then stored image so that the image thereafter displayed is a composite of the stored image and any added information. A single field or frame of television information can be captured and digitally stored in memory with new information being added thereto based on the brightness level of the new information relative to the stored image information so that the resulting display is a composite of the information in memory. In a peak-white mode of operation, preselected information added to the memory includes only few information that is "whiter" that the stored information (alternately, in a peak-black mode of operation adding of new information to memory is dependent upon whether the new information is "blacker" than the stored information), with such information being selected through use of video peak storing memory. Either monochrome video signals or encoded color TV signals can be processed and displayed.

8 Claims, 6 Drawing Figures

COMPOSITE SINGLE VIDEO IMAGE SYSTEM AND METHOD UTILIZING VIDEO PEAK STORING MEMORY

FIELD OF THE INVENTION

This invention relates to forming single video images, and, more particularly, relates to forming a composite of such images utilizing video peak storing memory.

BACKGROUND OF THE INVENTION

Storing or "freezing" of a single field or frame of a video, or television, image has been shown to be useful for a number of purposes, including, for example, capture of transient phenomena for subsequent observation and analysis. It has also been found to be useful to be able to compare two or more captured images in order to determine various relationships such as, for example, the relative displacement of objects within the field of view.

It has also been known heretofore that photographic film can be utilized to record a plurality of scenes, such as "time exposure" pictures. The use of photographic film (as well as known electronic systems using video memory devices) produces, however, an integrating effect which limits the length of time of exposure.

While various systems and methods have heretofore been suggested, developed and/or utilized to accomplish the foregoing, none of the systems or methods have been found to be completely satisfactory due either to being limited in capability or unduly cumbersome due to required circuitry such as, for example, requiring a multiplicity of memories and/or the use of a high speed external computer.

SUMMARY OF THE INVENTION

This invention provides an improved system and method for forming single video images utilizing video peak storing memory to enable an image to be stored and displayed that includes a composite of previously stored and new information.

In use, a single field or frame of video information (either monochrome or encoded color TV) may be captured and stored in memory and preselected new information added thereto, with the new information being superimposed upon the old information to form a composite image that can be thereafter displayed.

It is therefore an object of this invention to provide an improved system and method for forming a composite single video image.

It is another object of this invention to provide an improved system and method for forming a composite single video image that is efficient yet flexible.

It is another object of this invention to provide an improved system and method for forming a composite single video image by adding new information to a then stored image.

It is another object of this invention to provide an improved system and method for forming a composite single video image that is capable of selecting new information to be added to memory for later display of a resulting composite image.

It is still another object of this invention to provide an improved system and method for forming a single video image that utilizes peak storing memory for permitting new information to be added to memory only if such information meets predetermined criteria so that the resulting image in memory is a composite of an image originally placed in memory and new information added thereto.

It is yet another object of this invention to provide an improved system and method for forming a single video image that may be utilized to process either monochrome video signals or encoded color TV signals.

It is yet another object of this invention to provide an improved system and method for forming a single video image that does not produce an integrating effect and hence enables "viewing" of a scene for extended periods of time without over-exposure.

With these and other objects in view, which will become apparent to one skilled in the art as the description proceeds, this invention resides in the novel construction, combination, arrangement of parts and method substantially as hereinafter described and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
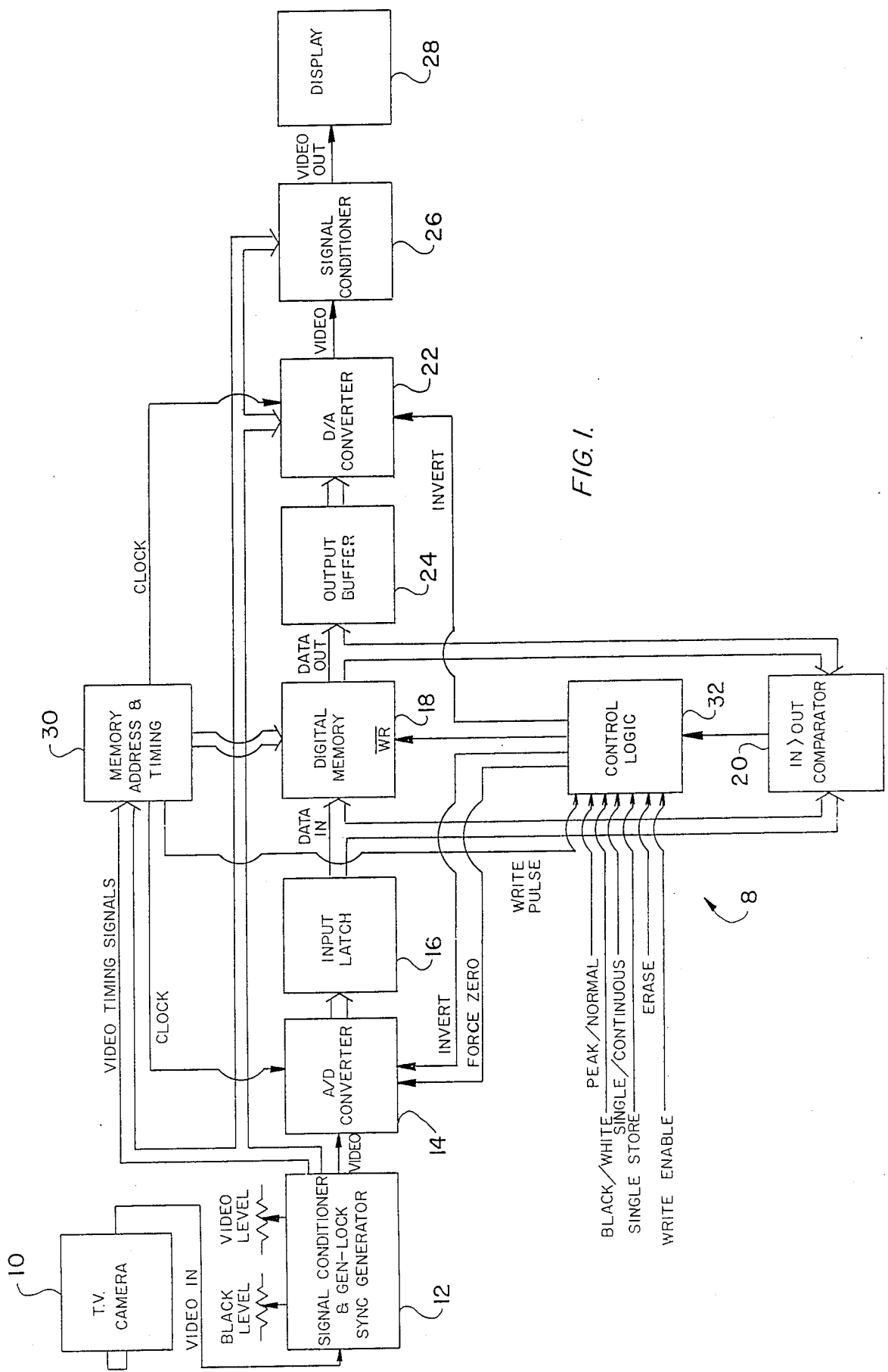
FIG. 1 is a block diagram of the device of this invention.

Referring now to the drawings, system 8 of this invention is illustrated in block form in FIG. 1. A scene is raster scanned by television camera 10 (or other compatible sensing device) to provide a video in signal that is coupled to signal conditioner and gen-lock sync generator unit 12. Unit 12 provides DC level restoration, as well as separating the sync pulses from the video signal for timing and clamping purposes.

The video output signal representative of the image, or scene, is coupled from unit 12 to analog-to-digital (A/D) converter 14 where the incoming analog signal is converted to a digital output signal. The digital output signal (data in) from A/D converter 14 is coupled through input latch 16 to digital memory 18 where the signal is stored in the digital memory with a unique address for each of the picture elements.

The data in signal is also coupled to comparator 20 for comparison purposes with the data out signal from digital memory 18. At comparator 20, the incoming digital picture elements for each location are compared, during successive scans, with like picture elements, then stored in the digital memory, and a new value (brightness) is added to the stored information only if the new value exceeds the previously stored value for that location.

The data out signal from digital memory 18 is also coupled to digital-to-analog (D/A) converter 22 through output buffer 24. The video output from D/A converter 22 is coupled in analog form to signal conditioner 26. The video output from signal conditioner 26 (along with synchronizing pulses) is suitable for display of the stored image and may be coupled to a display 28, which display can be, for example, a television monitor for continuous display of the stored image.

Signal conditioner and gen-lock sync generator 12 provides video timing signals to D/A converter 22, signal conditioner 26, and memory address and timing unit 30. Memory address and timing unit 30 provides clock pulses to A/D converter 14 and D/A converter 22, as well as providing an input to digital memory 18.

As also indicated in FIG. 1, a $\overline{WR}$ input is provided to digital memory 18 from control logic unit 32, which unit receives externally controllable (through front panel switches—not shown) inputs, including peak/normal, black/white, single/continuous, single store, erase, and write enable, as well as a write pulse from memory address and timing unit 30. Control logic unit 30, in turn, provides a force zero input and an invert input to A/D converter 14, and an invert input to D/A converter 22.

The basic techniques of video memory operation are known, as is the use of a memory unit including a signal conditioning and gen-lock signal generator receiving a video in signal, an A/D converter, a digital memory, a D/A converter, a signal conditioner for providing a video out signal, and a memory address and timing circuit. Such a unit is manufactured and sold by Colorado Video Incorporated, Boulder, Colo., as CVI Model 491 Memory Unit.

This invention utilizes, basically, a memory unit, such as above described, reconfigured to enable the information stored in the digital memory to be read out and compared with new incoming video data with new data being written into the digital memory only if the new data falls within predetermined criteria, all of which is accomplished within the same memory cycle and in real time.

Figure 2:
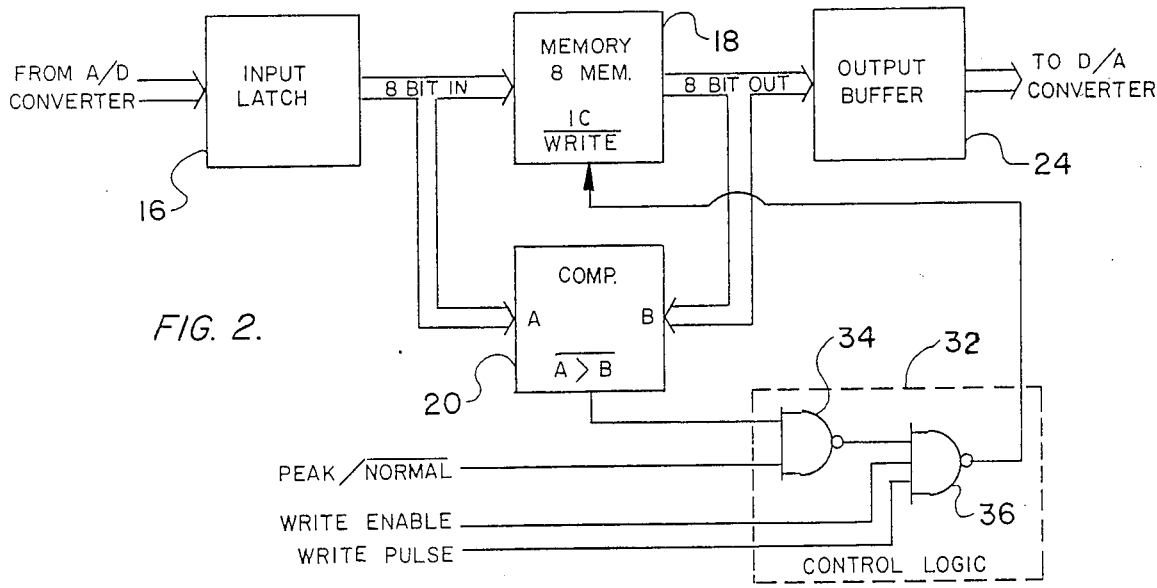
FIG. 2 is a simplified block and schematic diagram of the comparator and a portion of the logic control unit shown in FIG. 1.

A simplified block and schematic diagram is shown in FIG. 2 to better illustrate operation of the comparison circuitry utilized in this invention. As shown, control logic unit 32 includes, as a part thereof, a pair of NAND gates 34 and 36. Gate 34 receives a first input from comparator 20 indicative of $\overline{A>B}$ and a second input indicative of a selected $\overline{\text{PEAK/NORMAL}}$ condition. The output from gate 34 is provided as one input to gate 36, which gate receives second and third inputs indicative of WRITE ENABLE and WRITE PULSE. The output from gate 36 is coupled to digital memory 18 as the $\overline{\text{WRITE}}$ $(\overline{WR})$ input thereto.

The memory unit utilized is a high speed digital video memory with processing at normal television rates, typically ten million conversions per second, or greater. While the memory utilized could vary as to size, a digital RAM memory unit organized as 512 picture element per scan line, with 512 lines, (484 displayed) has been found to be generally preferable, as has the use of 8-bit A/D and D/A converters with each memory location containing 8 bits of pixel brightness data. FIG. 2 illustrates a portion of the comparator-memory configuration, which is repeated four times for full memory.

The memory is also capable of operation in single-field mode at 256 lines (242 displayed), and this mode has been found preferable for some applications.

The memory employs the read-modify-write cycle of the memory integrated circuits employed, thus allowing both reading and writing in a single memory cycle, which is used to advantage in this invention.

Figure 3:
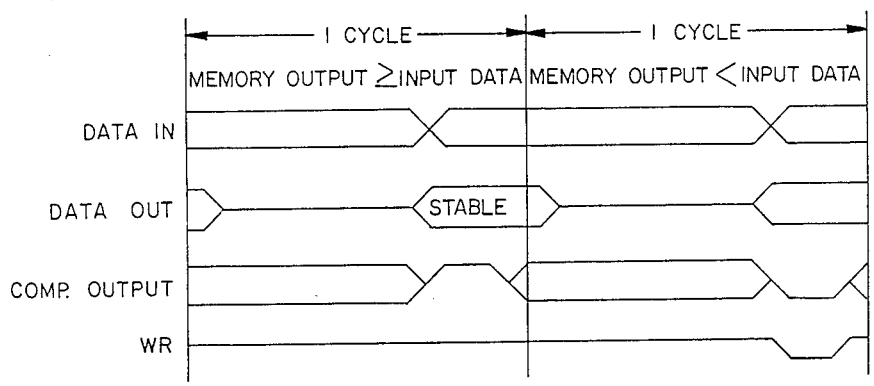
FIG. 3 is a timing diagram illustrating functioning of the memory shown in FIG. 1.

In operation in the peak-white mode, erasure to black is carried out prior to starting the peak storage process. Information is then written into memory from the video input of the television camera during a first cycle. As indicated in FIG. 3, during each succeeding memory cycles (two cycle are shown in FIG. 3), the contents then stored in the memory become available for output before new data, if any, must be written into the memory. Since new input data is also available at this time, the data stored in memory can be compared with the new data for each pixel, and the new input data is written into memory if it is of a higher numeric value than the then stored data for that pixel. Such new information may be added continuously or intermittently.

As specifically shown in FIG. 3 for illustrative purposes, the memory output was arbitrarily chosen to be equal to or greater than the input data during the first cycle illustrated and smaller than the input data during the second cycle illustrated. This resulted in a $\overline{WR}$ output from the comparator only during the second cycle illustrated, and hence new data would be entered only during the second cycle as illustrated in FIG. 3.

The process may be continued as long as desired, and can be utilized to capture random events without need for special detector and/or synchronizing devices or circuitry since the device is not an integrating device, is not sensitive to long time exposures, and responds only to changes in the viewed scene.

While a peak-white store mode is described hereinabove, it is to be realized that a peak-black store mode may also be provided, if desired, by inverting the data. Inversion of the video input signal and then re-inverting the video output signal allows black to be the higher numeric values seen at the memory terminals in the peak-black storage mode to thus add black to a white background. When operating in this mode, the memory is initially forced to white prior to starting the peak storage process. Black input video that is found to be numerically higher than whiter previous data is then written into the memory. This allows "time exposure" of dark objects or subjects to be recorded on lighter backgrounds (a function not achievable by normal photographic methods). This feature may be used, for example, to "electronically paste" images on a white background, or to "track" birds or aircraft against a light sky.

As also indicated in FIG. 1, an input is also provided for switching to normal frame-store mode if desired. In the normal frame-store mode, the comparator outputs are ignored, and the new input data is stored regardless of previous memory contents.

Figure 4:
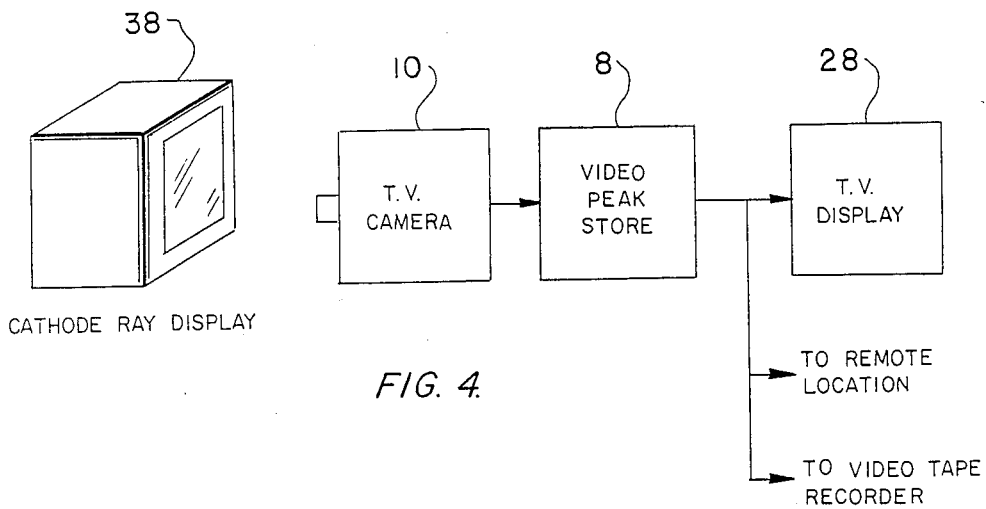
FIG. 4 is a block diagram of an electro-optical scan conversion system utilizing this invention.

The device of this invention may also be utilized for electro-optical scan conversion, as indicated in FIG. 4. As shown, TV camera 10 is positioned adjacent to the faceplate of a cathode ray tube 38 to view the display thereat. The cathode ray display can have any scanning format (i.e., oscilloscope, radar, etc.) and can be recorded into memory in either a fast or a slow manner. Video peak storage unit 8 is capable of processing the incoming signals to allow forming of a composite video signal in the same manner as indicated hereinabove.

Timing circuitry can also be provided so that only every Nth field or frame is utilized for comparison purposes, where N is chosen as an even integer.

Figure 5:
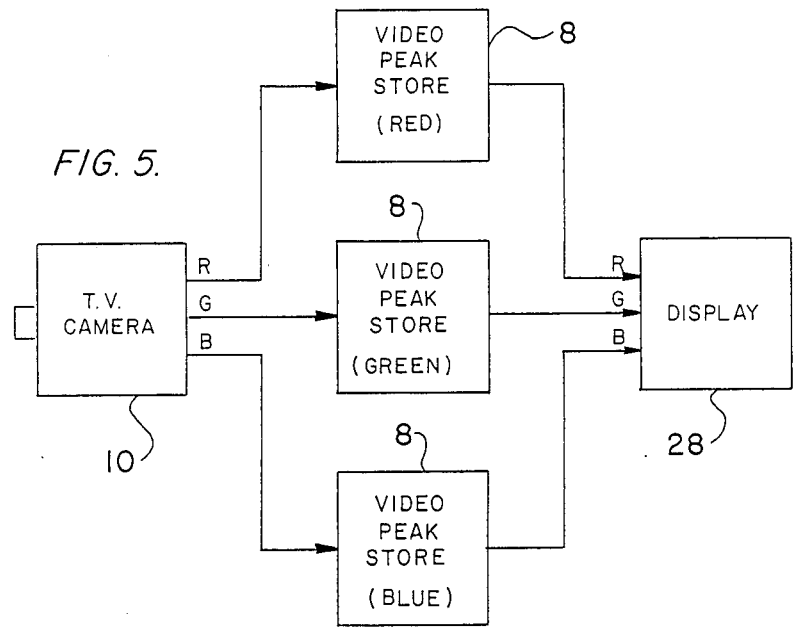
FIG. 5 is a block diagram illustrating use of this invention to process a color signal.

For color operation, the separate red, green and blue components from TV camera 10 are coupled to three separate video peak store units 8, as indicated in FIG. 5. After processing, the video output signals from the three video peak storage units are then coupled to display 28 for display of the composite color image. NTSC composite color signals may be recorded by the video peak store device of this invention if succeeding images coupled to the memory circuits have the color subcarrier information in the same phase. This is accomplished by either selecting only every fourth field or by selecting every other frame for comparison and recording purposes. Alternately, the color subcarrier component may be slightly delayed (by one quarter cycle) on a field-to-field basis.

A remote control device may also be added to demand either single frame store cycles or single erase cycles at intervals or for some unspecified user device to control the functioning of the peak store unit when synchronization with some external event is required for a particular application.

Noise reduction in static video images is also provided. Noise reduction of a unique form is an inherent characteristic of the device of this invention. Random, or coherent, noise will tend to "fill in the gaps" and after a period of time result in a "quieter" picture with either a positive or negative brightness offset depending upon input video polarity and the peak amplitude of the noise (no noise reduction occurs, however, in the case of impulse noise).

Figure 6:
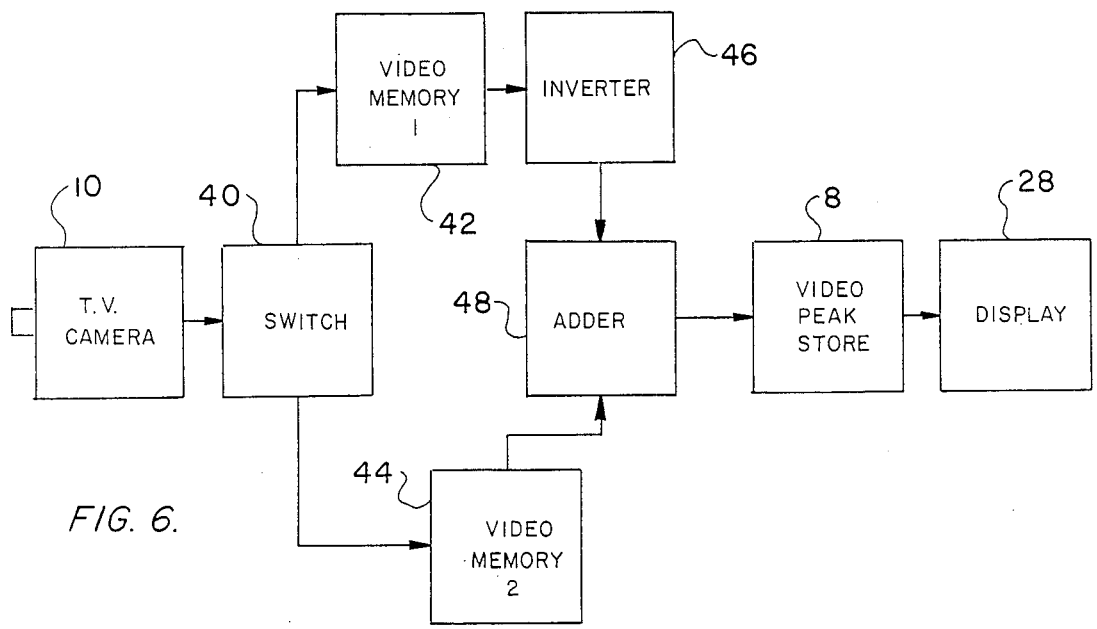
FIG. 6 is a block diagram illustrating use of the invention for display of dynamic image changes.

A dynamic subtracter can also be utilized for forming a display of dynamic change. As indicated in FIG. 6, the video output from TV camera 10 is coupled to switch 40 for alternate coupling of the video input signal to video memory units 42 and 44. The output from video memory unit 42 is inverted by inverter 46 and the outputs from the video memories are then summed in adder 48 and coupled to video peak storage unit 8 for forming of the composite image thereat. The output from video peak store unit 8 is then coupled to display 28 for display of dynamic changes in the viewed image. Thus, by simple video polarity inversion and subtraction of the contents of the memories, a display can be achieved of only dynamic changes occuring over a fixed period of time.

As can be appreciated from the foregoing, the device of this invention can "view" an image indefinitely without over-exposure, and will continuously (or intermittently, if desired) add new information to that already stored in the digital memory if the new information meets the selected criteria (i.e., has a brighter level than that stored in the memory). The device accepts standard or nonstandard TV signals in either monochrome or color (including TV signals such as NTSC or other standards) and provides a composite image formed from the image stored and newly added information.

This invention thus provides an improved system and method for forming a composite single video image.

What is claimed is:

1. A video image forming system capable of producing an image consisting of information derived from a plurality of frames of video input signals, said video image forming system, comprising:
    input means for receiving, by frames, a composite video signal representative of an image and providing output data in analog form indicative of said frames of said composite video signal;
    analog-to-digtal converter means for receiving said output data from said input means and providing first output data in digital form indicative of said frames of said composite video signal;
    digital memory means having an input connected with said analog-to-digital converter means, said digital memory means selectively storing said first output data from said analog-to-digital converter means and providing said output data stored as second output data in digital form with said second output data not being applied to said input of said digital memory means;
    digital-to-analog converter means for receiving said second output data from said digital memory means and providing output data in analog form indicative thereof;
    output means connected with said digital-to-analog converter means for providing an output signal suitable for display represented by said second output data from said digital memory means;
    comparator means connected with said analog-to-digital converter means and said digital memory means for receiving said first and second output data in digital form from said analog-to-digital converter means and said digital memory means and effecting a comparison of said first and second output data; and
    control means connected with said analog-to-digital converter means and said digital-to-analog converter means to control converting of said output data, end connected with said digital memory means and said comparator means for initially enabling said first output data indicative of at least one frame of the composite video signal to be stored in said digital memory means so that said comparator means thereafter receives said first output data from said analog-to-digital converter means and said second output data from said digital memory means, with said first output data and said second output data being representative of a like number of frames and with said comparator means comparing predetermined corresponding parts of said first output data and said second output data, whereby, responsive to comparison of said first output data and said second output data by said comparator means, said control means enables said parts of said first output data representative of a value greater than that of said corresponding parts of said second output data to be stored in said digital memory means to replace corresponding parts of said output data stored in said digital memory means with said replacement being not limited to a single replacement occurrence.

2. The system of claim 1 wherein said control means includes timing means to enable comparison of said first output data and said second output data at predetermined intervals based upon a preselected number of frame reoccurrences of said composite video signal received at said input means.

3. The system of claim 2 wherein said received composite video signal is an NTSC color TV signal, and wherein said first output data is representative of the video information and color subcarrier of said received composite video signal and is stored in proper phase relationship in said digital memory means.

4. The system of claim 1 wherein said digital memory means includes a plurality of separate digital memories, wherein said composite video signal includes related multiple video information capable of being separated into segments relating to the red, green and blue components of a color signal, and wherein said system includes means for separating said related multiple video information into said separate segments and separately directing said separated segments to said plurality of digital memories for storage therein.

5. The system of claim 1 wherein said input means includes subtraction means for receiving said composite video signal representative of an image and providing as said output data from said input means a difference output that is representative of changes in said image.

6. The system of claim 5 wherein said subtraction means includes a switch connected to receive said composite video signal representative of an image, a pair of video memories connected with said switch for alternately receiving said video signal through said switch, an inverter connected with one of said video memories to receive the outputs therefrom, and combining means for combining the outputs from said inverter and the other of said video memories.

7. The system of claim 1 wherein said control means includes means to periodically cause said output data stored in said digital memory means to be erased from said digital memory means.

8. The system of claim 1 wherein said system includes an input latch connected between said analog-to-digital converter means and said digital memory means, and an output buffer connected between said digital memory means and said digital-to-analog converter means.

* * * * *